United States Patent [19]

Nimura et al.

[11] Patent Number: 5,523,201
[45] Date of Patent: Jun. 4, 1996

[54] METHOD FOR DESALTING SILVER HALIDE EMULSION AND SILVER HALIDE EMULSION PREPARED THEREBY

[75] Inventors: Yumiko Nimura; Kazuyoshi Ichikawa; Haruhiko Masutomi; Chikao Mamiya, all of Hino, Japan

[73] Assignee: Konica Corporation, Japan

[21] Appl. No.: 412,263

[22] Filed: Mar. 28, 1995

[30] Foreign Application Priority Data

Mar. 31, 1994 [JP] Japan ................................. 6-063200
Nov. 24, 1994 [JP] Japan ................................. 6-289928

[51] Int. Cl.$^6$ ............................. G03C 1/015; G03C 11/06; B01D 61/42
[52] U.S. Cl. ........................... 430/569; 430/567; 204/528; 204/529
[58] Field of Search ............................. 430/569, 567; 204/182.3, 182.4, 182.6, 183.2, 186

[56] References Cited

U.S. PATENT DOCUMENTS

| | | | |
|---|---|---|---|
| 4,711,722 | 12/1987 | Toyoshi et al. | 210/638 |
| 4,758,505 | 7/1988 | Hoffmann | 430/569 |
| 5,169,750 | 12/1992 | Vacca | 430/569 |
| 5,223,388 | 6/1993 | Saitou | 430/569 |

FOREIGN PATENT DOCUMENTS 1075943  2/1960  Germany ................................. 430/569

*Primary Examiner*—Mark F. Huff
*Attorney, Agent, or Firm*—Jordan B. Bierman; Bierman and Muserlian

[57] ABSTRACT

A desalting method of a silver halide emulsion is disclosed, comprising removing soluble salts from the silver halide emulsion by electrodialysis, wherein said electrodialysis is carried out at a pH within a range of ±0.5 of an isoelectric point of a gelatin contained in the silver halide emulsion. Furthermore, by adding a salt during the course of the electrodialysis, the concentration of the emulsion is accomplished concurrently with desalting thereof.

10 Claims, 3 Drawing Sheets

METHOD FOR DESALTING SILVER HALIDE EMULSION AND SILVER HALIDE EMULSION PREPARED THEREBY

FIELD OF THE INVENTION

The present invention relates a method of desalting a silver halide photographic emulsion and desalting-concentration thereof, and more particularly, desalting of silver halide emulsion and concentration thereof which is efficiently performed without adversely affecting the emulsion, and a silver halide emulsion and photographic light-sensitive material prepared thereby.

BACKGROUND OF THE INVENTION

As a technique of removing extraneous salts resulted from the reaction of silver salt with a halide salt in a process of preparing a silver halide photographic emulsion (hereinafter referred to as emulsion), a so-called desalting method, there has been employed a coagulation process in which a protective colloid is coagulated with a coagulating agent and the resulting supernant solution is removed, as disclosed in JP-A 48-13057 (the term "JP-A" means an "unexamined published Japanese patent application), JP-A 59-166939, 60-220337, 60-52844, 62-212642, 62-237993, 63-214743 and 2-272442.

In this method, however, a coagulating agent is adhered to the grain surface to affect adversely spectral sensitization and chemical sensitization. As a result of adhesion of a coagulatig agent to grains, it becomes impossible to cause the grains to grow as seed grains and even if grains have been grown up, it become difficult to form silver halide having an intended internal structure, since an interface is formed by the coagulating agent inside the grain.

In order to avoid these unfavorable effects, there has been employed a method of desalting without the use of a additive such as a coagulating agent. A noodle washing method has been long-employed so far, in which an emulsion is cooled down to be set and shredded in the form of noodle to be washed is disclosed, for example, in JP-A 47-44487 49-46255. In this method, however, it needs a longer time to complete the desalting and moreover, an incorporation of a large amount of water into the emulsion resulted in an increase in volume thereof, causing to lower efficiency in the subsequent emulsion-making process such as chemical ripening, storage and transportation thereof.

There was also reported a ultrafiltration by use of a semipermeable membrane, as disclosed in JP-A 57-209823, 59-43727, 62-113137, 2-172816, 2-172817 and 3-140946. This technique has been employed as useful means, since the emulsion does not incorporate water therein but contrarily, is slightly concentrated. In this technique, however, prospects for shortening a processing time is poor and a problem such as clogging of the filter has been further raised. As methods for solving these problems, is cited a process of applying ion-exchange, as disclosed in JP-A 61-219948, 62-23035, 63-40137, 63-40039 and 4-22942. Among these, a desalting process by applying electrodialysis is considered to be the most effective in desalting. However, a desalting method by applying conventional electrodialysis to the emulsion is insufficient in concentrating ability and therefore, an improvement thereof has been desired.

For the purpose of preparing uniform grains (e.g., in grain size, crystal habit, or halide distribution within the grain), there was proposed a fine-grain supplying method as disclosed in JP-A 1-183417 and 1-183645, and World Patents WO 89-06830 and WO 89-06831, in which there were not disclosed means for removing unnecessary salts from the fine grain emulsion. To desalt the fine grain emulsion, there was disclosed a process of applying the ultrafiltration in JP-A 2-172816 and 2-172817. These methods, however, have disadvantages as set forth in the above-mentioned ultrafiltration and an improvement is further desired.

SUMMARY OF THE INVENTION

In view of the above-mentioned problems, the object of the present invention is to provide a method for removing, rapidly and efficiently, extraneous salts contained in a silver halide photographic emulsion; a desalting-concentrating method capable of concentrating sufficiently the emulsion; a silver halide photographic emulsion and silver halide photographic material of which characteristics are not adversely affected thereby, as in the prior coagulating agents.

Another object of the invention is to achieve improvements in photographic performance by preparing a silver halide emulsion with the use of a fine grain emulsion which has been desalted and concentrated in a manner as above-mentioned.

The above-mentioned objects of the present invention can be accomplished according to the following.

(1) A desalting method characterized in that electrodialysis is carried out at a pH within a range of ±0.5 of the pH at an isoelectric point of an ampholytic component present as a protective colloid in a system.

(2) A desalting and concentrating method characterized in that concentration is performed by adding a salt at the time when applying electrodialysis to remove unnecessary salts.

(3) The desalting method as described in (1) characterized in that the protective colloid is gelatin.

(4) A desalting method or desalting-concentrating method as described in (1), (2) or (3) characterized in that said system is a silver halide photographic emulsion.

(5) A silver halide emulsion characterized in that the emulsion is desalted or desalting-concentrated by a method as described in (1), (2), (3) or (4).

(6) In a fine grain-supplying method for growing silver halide emulsion grains by supplying silver halide fine grains having smaller sizes than those of the emlsion grains, the method characterized in that the fine grains are desalted or desalting-concentrated by a method as described in (1), (2), (3) or (4) and then supplied to the emulsion.

(7) In the fine grain-supplying method as described in (6), the method characterized in that the emulsion grains and fine grains are silver halide.

(8) A silver halide photographic light-sensitive material characterized in that the photographic material is prepared by the fine grain-supplying method as described in (6) or (7).

Figure 1:
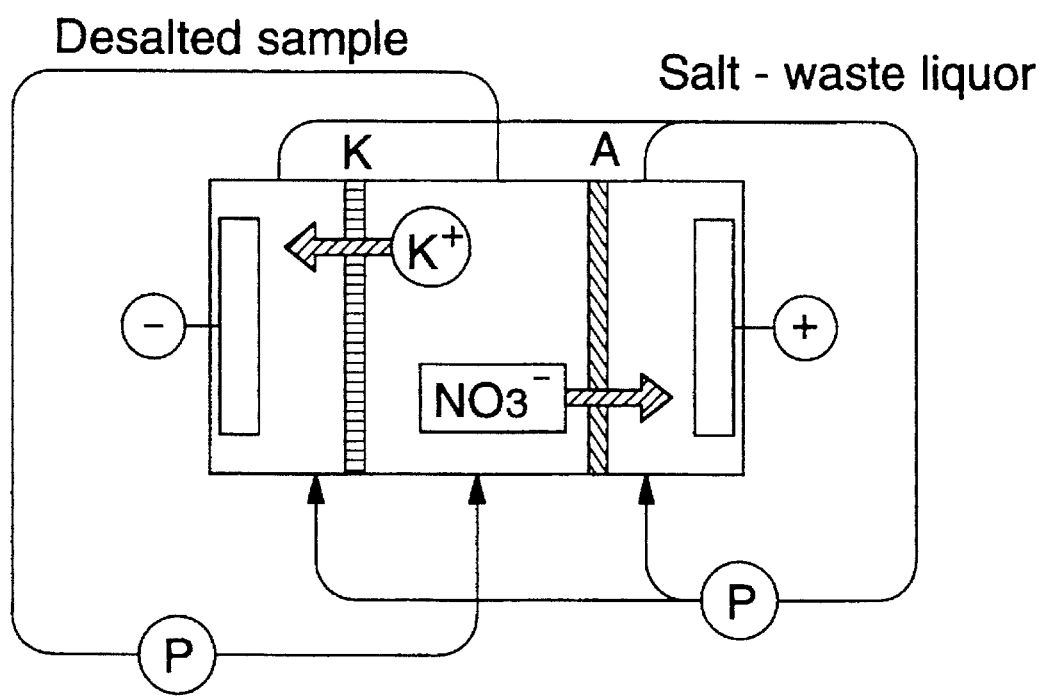
FIG. 1 is a schematic illustration indicating the desalting by electrodialysis.

Explanation of Codes and Symbols:

K: Cation-exchange membrane

A: Anion-exchange membrane

P: Pump
1: Cation-exchange membrane
2: Anion-exchange membrane
3: Emulsion chamber
4: Salt-waste liquor chamber
5: Electrode chamber
6: Cathode
7: Anode
8: Outer frame
9, 9': Emulsion
10, 10': Salt-waste liquor
11, 11': Electrode solution

DETAILED DESCRIPTION OF THE INVENTION

In the present invention, the term, "isoelectric point" means, as well-known in the art, a pH value at which positive and negative charges of an ampholytic material are equivalent with each other within the range of while the ampholytic material is converted from a sufficiently strong acidic region in which the ampholytic material has the positive charge alone to a region in which carboxy groups thereof is completely dissociated. The isoelectric point can be determined by measuring a pH at which a net charge of the ampholytic material solution is reduced to zero by ion-exchanging treatment.

Electrodialysis is carried out in such a manner that an ion-containing solution is placed in between an anion-exchange membrane and a cation-exchange membrane and a direct current voltage is applied between the anion- and cation-exchange membranes so that anions are transferred through the anion-exchange membrane to the anode side and cations are transferred through the cation-exchange membrane to the cathode side, ions being removed from the solution placed between the membranes. A desalting method of the present invention is based on the above-mentioned principle.

In the course of electrodialysis, the ions are transferred with water molecules hydrated to the ions. Resultingly, water is also removed from the solution to be desalted in proportion to the amount of transferable ions contained in the solution. Therefore, one advantageous feature of the electrodialysis is that the higher is a salt concentration of a solution, the more water is removed. Utilizing this principle, in order to concentrate an emulsion, a large amount of salts is further added to the emulsion. Thus, the salts added to the emulsion during the course of the electrodialysis are also removed with water so that the emulsion can be concentrated without incresing a salt concentration thereof. The desalting and concentration method of the present invention is based on the above principle.

In the emulsion preparation by a fine grain-supplying method, the above-mentioned method can be preferably applied for desalting and/or concentrating an fine grain emulsion to be supplied.

The present invention will be explained more in detail in the following.

FIG. 1 is a schematic illustration showing the manner of electrodialysis.

Basically, a photographic emulsion is prepared by reacting silver nitrate with a halide salt such as sodium chloride, potasium bromide or a small amount of silver iodide to precipitate silver halide, wherein extraneous salts such as sodium nitrate, potassium nitrate, or excess sodium chloride or potassium bromide are produced or remained so that the removal of these salts is necessitated.

In FIG. 1, a salt in a solution is dissociated into a cation (e.g., $K^+$) and an anion (e.g., $NO_3^-$). K indicates a cation-exchange membrane capable of causing only cation to pass therethrough; and A indicates an anion-exchange membrane capable of causing only anion to pass therethrough. A cathode (−) is placed in the outside of the K-menbrane and an anode (+) is placed in the outside of the A-membrane. When a direct current is applied between both electrodes, cations in the solution are attracted toward the cathode, passing through the K-membrane to reach the cathode; and anions are attracted toward the anode, passing through the A-membrane to reach the anode. Anions transferred to the anode-side and cations transferred to the cathode-side cannot pass through the A-membrane and K-membrane, respectively. Since ions which have once passed through the ion-exchange membrane cannot return to the original solution, desalting is consequently accomplished.

As protective colloid present in the emulsion applicable in the desalting method of the present invention, is used a conventional high molecular weight gelatin. Examples thereof are described in Research Disclosure No.17643 (December, 1978), Item IX. Emulsions applicable in the desalting method of the present invention is is not limitative.

A salt usable for the concentration is not specifically limited but optimaly selected according to conditions. Potassium nitrate contained in a conventional silver halide photographic emulsion is preferably used. Potassium nitrate is added, for example, at a time when conductivity is lowered to 30% or less of that at the initial time during the course of dasalting and in an amount not so as to allow to exceed the conductivity at the initial time.

A fine grain-supplying method has been known as a method effective in preventing ununiformity produced upon the reaction of a halide salt solution with a silver salt solution during the course of preparing an emulsion. When a halide salt and silver salt are supplied into a reaction vessel to react with each other, ununiform grain-growth due to inhomogeneous salt concentrations in the reaction vessel leads to the formation of ununiform grains in size, crystal habit, or halide distribution among or inside the grains. As a way for avoiding the inhomogeneity in the reaction vessel during the course of grain growth, previously-prepared silver halide fine grains having sizes of 0.05 μm or less are supplied, as a source of silver halide, to a mother liquor containing silver halide seed grains to cause the seed grains to grow. In this process, a problem to be solved is to remove extraneous ions other than silver halide fine grains and excess water from the fine grain emulsion. In view of the foregoing, it can be said that the desalting method and concentrating method of the present invention are the most suitable to the emulsion preparation by the fine grain-supplying method as above-mentioned.

In the application of the electrodialysis of the present invention to desalting of the emulsion, the electrodialysis is carried out at a pH within a range from an isoelectric pH of an ampholytic compound such as gelatin present as a protective colloid in the emulsion minus 0.5 to the isoelectric pH plus 0.5; preferably, within a range of ±0.2 of the isoelectric pH; and more preferably at the isoelectric pH.

An ion-exchange membrane usable in the electrodialysis is optimally elected, according to the purpose for use, from various kinds of commecially available membranes. There may be used a membrane synthesized for a specific purpose.

In the fine grain-supplying method, it is preferable that a fine grain emulsion desalted or concentrated by the method of the present invention be used and a suface portion of the emulsion grain be grown by supplying fine grains of the present invention.

EXAMPLES

Example 1

To an aqueous 2 wt. % gelatin solution maitained at 40° C. were added an aqueous 4N silver nitrate solution and aqueous 4N potassium bromide solution to prepare a silver halide emulsion EM-0 by controlled double jet addition. From electron micrographic observation, resultant emulsion was shown to be comprised of monodispersed grains having an average size of 0.8 μm.

(Preparation of an inventive emulaion, EM-1)

The following solutions were prepared.

(A) 1000 ml of a silver halide emulsion EM-0 having a pH of 5.0 (corresponding to an isoelectric point of the gelatin)

(B) An aqueous 0.05N KNO$_3$ solution (C) An aqueous 0.3N KNO$_3$ solution

Figure 2:
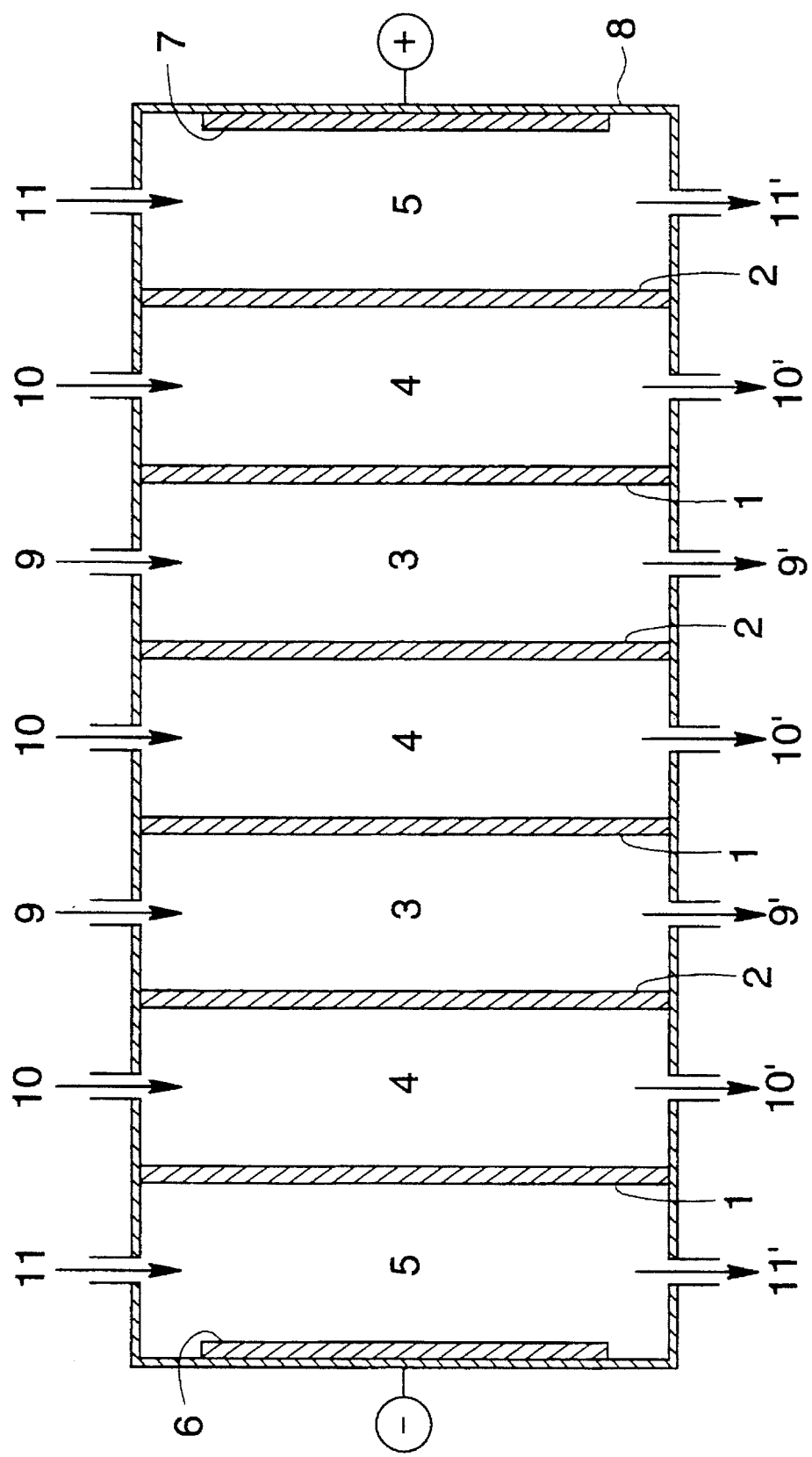
FIG. 2 is a shematic illustration of a desalting apparatus.

An appratus used in the present example is shown in FIG. 2. In FIG. 2, a cation-exchange membrane 1 and an anion-exchange membrane 2 are placed alternatively; emulsion chamber 3 for circulating an emulsion, salt-waste liquor chamber 4 for maitaining salts removed and electrode chamber 5 were each separated; and electrodes were provided on both outsides thereof. Solutions (A), (B) and (C) were introduced into the emulsion chamber 3, salt-waste liquor chamber 4 and electrode chamber 5, respectively to be each circulated, while being maintained at 35° C. Direct current is applied to cause ions contained in the emulsion to transfer, through a cation- or anion-exchange membrane, to the salt-waste liquor chamber 4 to obtain a silver halide emulsion from which extraneous salt was removed.

(Preparation of emulsions EM-2 through EM-7)

Emulsions EM-2. EM-3, EM-4, EM-5, EM-6 and EM-7 were desalted by electrodialysis in the same manner as in EM-1, except that a pH value of emulsion EM-0 were change to 2.0, 4.0, 4.5, 5,5, 6.8 and 9.0, respectively.

Figure 3:
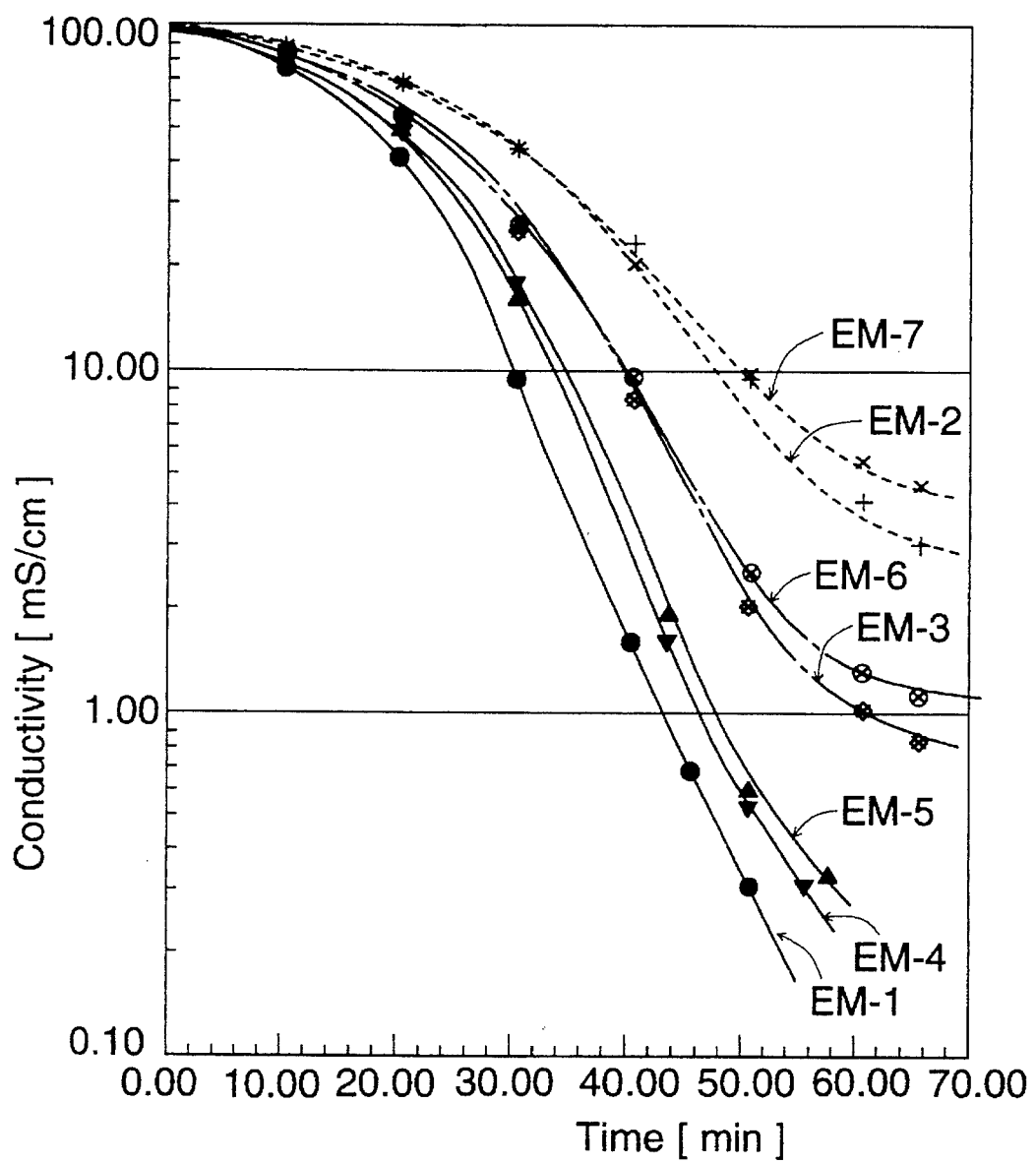
FIG. 3 is variations of conductivities indicating a desalting state by electrodialysis.

As a means for exhibiting an extent of desalting, the variation of conductivity during the course of the treatment was measured. A decrease of the conductivity indicates a decrease of ions contained in the emulsion. Times required for completing the electrodialysis and conductivity variations of emulsions EM-1 through 7 are shown in FIG. 3. As can be seen therefrom, inventive emulsions which were desalted at the pH of 5.0 or within the range of 5.0±0.5 achieved a rapid and highly efficient desalinization, as compared to emulsions desalted at the pH of other values. In view of clogging occurred in the line, there was little clogged with the emulsion desalted by the inventive method because of lowering of the viscosity of the emulsion at a pH in the vicinity of the isoelectric point so that desalting can be efficiently proceeded with little loss of the emulsion.

Example 2

(Preparation of comparative emulsion EM-8)

To emulsion EM-0 was added a flocculating agent, Demol N (Product of Kao-Atlas Co., Ltd.) to flocculate the emulsion and the supernatant liquid was decanted. This procedure was repeated twice to remove unnecessary salts and then an aqueous gelatin solution was added thereto to obtain emulsiom EM-8.

(Comparison with the present invention and results thereof)

To emulsions EM-1 and EM-8 were subjected to spectral sensitization by adding the following sensitizing dyes to obtain emulsion samples, a and b. These samples were subjected to centrifugation and the amount of adsorbed dyes (dye absorption coefficient), which was determined from the amount of unadsorbed dyes remained in the supernatant was compared. Results thereof are shown as below.

Sensitizing dye (1): anhydro-5.5'-di-(3'-sufopropyl)-9-ethylthiacarbocyaninehydroxide pyridinium salt Sensitizing dye (2): anhydro-9-ethyl-3,3'-di-(3'-sulfopropyl)-4,5,4',5'-benzothiacarbocyaninehydroxide ethylamine salt

TABLE 1

| Sample | Emulsion | Desalting method | Dye absorption coefficient | Remarks |
|---|---|---|---|---|
| a | EM-1 | Electrodialysis | 22.22 | Invention |
| b | EM-8 | Flocculation | 10.99 | Comparison |

As can be seen from the above results, inventive sample led to improved results in dye absortion as compared to comparative sample b. (Preparation of silver halide photographic material)

Emulsions EM-1 and 8 were each subjected to gold sulfur sensitization and further spectrally sensitized by using methanol solutions of Dye (1) and (2), and then a dispersion of a coupler as shown below was added to each thereof. Resulting solutions was coated on a cellulose triacetate film support to obtain samples c and d.

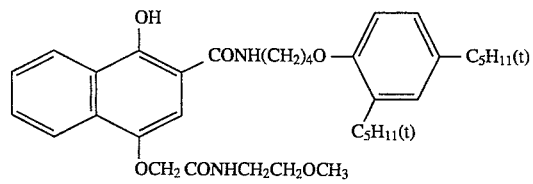

Thus prepared samples were subjected to wedge-exposure through Toshiba glass filter (Y-48) by using a light source having a color temperature of 5400° K. and then processed in accordance with the following procedure.

Samples were processed sccording to the following processing steps.

| Step | Time | Temperature (°C.) |
|---|---|---|
| Color developing | 1 min. 45 sec. | 38 ± 0.1 |
| Bleaching | 6 min. 30 sec. | 38 ± 0.1 |
| Washing | 3 min. 15 sec. | 24–41 |
| Fixing | 6 min. 30 sec. | 38 ± 3.0 |
| Washing | 3 min. 15 sec. | 24–41 |
| Stabilizing | 3 min. 15 sec. | 38 ± 3.0 |
| Drying | | 50 or less |

Processing solutions used in each step are as follows.
Developer:

| | |
|---|---|
| 4-Amino-3-methyl-N-thyl-N-(β-hydroxyethyl)-aniline sulfate | 4.75 g |
| Sodium sulfite anhydride | 4.25 g |
| Hydroxyamine.1/2 sulfate | 2.0 g |
| Potassium carbonate anhydride | 37.5 g |
| Sodium bromide | 1.3 g |

-continued

| Trisodium nitrilotriacetate monohydride | 2.5 g |
|---|---|
| Potassium hydride | 1.0 g |

Water was added to make 1 liter in total, and the pH was adjusted to 10.0 with sodium hydroxide.

Bleach:

| Ammonium ferric ethylenediaminetetraacetate | 100 g |
|---|---|
| Ammonium ethylenediaminetetraacetate | 10.0 g |
| Ammonium bromide | 150 g |
| Glacial acetic acid | 10.0 g |

Water was added to make 1 liter in total, and the pH was adjusted to 6.0 with an aqueous ammonia solution.

Fixer:

| Ammonium thiosulfate | 175.0 g |
|---|---|
| Sodium sulfite anhydride | 8.6 g |
| Sodium metasulfite | 2.3 g |

Water was added to make 1 liter in total, and the pH was adjusted to 6.0 with acetic acid.

Stabilizer:

| Formalin (37% aqueous solution) | 1.5 cc |
|---|---|
| Koniducks (Product of Konica) | 7.5 cc |
| Water to make | 1 liter |

Thus processed samples were sensitometrically measured by using red light with respect to fog ($D_{min}$), relative sensitivity and relative RMS.

Relative sensitivity is shown as a relative value of reciprocal of exposure amount necessary for giving a density of $D_{min}$+0.15, based on the sensitivity of sample c being 100. Relative RMS was measured at the same density ($D_{min}$+ 0.15) as in the realtive sensitivity. In the measurement of the relative RMS, a density portion was scanned with a microdensitometer provided with Wratten filter W-26 of Eastman Kodak and having an aperture area of 1800 cm² (slit width of 10 μm and slit length of 180 μm). A standard deviation of density variations of 1000 or more samples was determined and a RMS value of sample c was set to as 100. The smaller is the relative RMS, the better the graininess.

Results thereof are shown as below.

TABLE 2

| Sample | Emulsion | Fog | RMS (rel.) | Sensiti- (rel.) | Remarks |
|---|---|---|---|---|---|
| c | EM-1 | 0.05 | 100 | 100 | Invention |
| d | EM-8 | 0.13 | 142 | 63 | Comparison |

As can be seen from the the results, inventive sample c achieved superior results in fog, sensitivity and graininess to comparative sample d.

Example 3

(Preparation of emulsion EM-9)

In a manner similar to emulsion EM-0, there was prepared a monodispersed seed emulsion TEM-0 having an average size of 0.3 μm and a variation coefficient of 10%. The emulsion was desalted by the method of the present invention. The seed emulsion TEM-0 was introduced into a reaction vessel for ripening and thereto was added a fine grain emulsion which was previously prepared in a separate vessel and desalted in a manner similar to Example 1. With stirring with a propeller blade, the seed grains were further grown to prepare an emulsion EM-9 comprised of silver halide grains having an average size of 0.8 μm.

(Preparation of emulsion EM-10)

Similarly, a seed emulsion TEM-0 as above-mentioned was introduced into a reaction vessel for ripening and thereto was added a fine grain emulsion which was previously prepared in a separate vessel without being desalted. With stirring with a propeller blade, the seed grains were grown to obtain an emulsion EM-10 (an average grain size: 0.8 μm).

(Comparison and result)

Using X-ray diffractometer, emulsions EM-9, 10 and 1 were studied with respect to properties of silver halide crystals such as perfect crystallinity and orientation. The less strained crystal gives the narrower width of diffraction band. When ununiformity such as bend increases, the band width increases. The widening of the band, which is a measure of crystal perfectibility occurs when a crystal imperfection or twin crystal is included. Results of study are shown as below. The band width is expressed in terms of a half band width (2θ).

TABLE 3

| Emulsion | 2θ |
|---|---|
| EM-9 | 0.081 |
| EM-10 | 0.098 |
| EM-1 | 0.092 |

As can be seen from the results, grain crystals of emulsion EM-9 had less crystal imperfection as compared to emulsion EM-10. It is also shown that emulsion EM-1 which was desalted after physical ripening have more internal imperfections than emulsion EM-9. Thus, it is shown that a fine grain supplying method with use of fine grain emulsion desalted by the inventive method (EM-9) led to improved results.

Example 4

(Preparation of emulsion EM-11)

As in emulsion EM-1 of Example 1, an extent of removing extraneous salts was judged by monitoring a decrease of the conductivity of the emulsion, and when the conductivity was lowered to 30% or less of that at the initial time, potassium nitrate was added to the emulsion in an amount so as not to exceed the conductivity at the initial time and the electrodialysis was further continued. By repeating the procedure as above-mentioned twice, the emulsion was desalted and concentrated to obtain an emulsion EM-11.

(Preparation of emulsion EM-12)

Emulsion EM-12 was prepared in the same manner as in Em-11, except that the electrodialysis was carried out without adding potassium nitrate.

(Experimental results)

Final conductivities and silver halide-concentrations of emulsions EM-11 and 12 are shown as below. The concentration of silver halide, which was determined by the titration with sodium sulfide is shown in a relative value, based on the titrating amount of emulsion EM-0 prior to desalting being 100.

TABLE 4

| Emulsion | Conductivity (ms/cm) | Relative concentration |
| --- | --- | --- |
| EM-11 | 0.56 | 187.23 |
| EM-12 | 0.57 | 138.67 |

As can be seen from the results, the concentrating capability of electrodialysis was improved by adding a salt during the course of dialysis.

Example 5

(Preparation of emulsion EM-13)

In a similar manner to EM-0 was prepared a monodispesed silver halide emulsion having an average size of 0.3 μm and a variation coefficient of 10%, which was futher desalted and concentrated in a manner similar to EM-11 of Example 4. This seed grain emulsion (TEM-1) was introduced into a ripening vessel for ripening a silver halide emulsion. A fine grain emulsion having a smaller average size than that of emulsion TEM-1, which was separately prepared and desalting-concentrated in the same manner as in Example 4, was added to the ripening vessel. The emulsion was subjected to ripening with stirring with a propeller blade to obtain a silver halide emulsion EM-13.

(Preparation of emulsion EM-14)

A emulsion EM-14 was prepared in the same manner as in EM-13, except that a seed grain emulsion to be added was desalted without adding a salt during the electrodialysis as in EM-12.

(Results)

Relative ripening time and relative finl volume are shown as below.

Relative ripening time is a relative value based on that in the preparation of EM-14, the disappearance time of fine grains is 100.0, showing that the smaller is the value, the more rapidly has finished the ripening.

TABLE 5

| Emulsion | Relative ripening time (min) | Relative final volume (ml) |
| --- | --- | --- |
| EM-13 | 83.7 | 79.7 |
| EM-14 | 100.0 | 100.0 |

As can be seen from the above results, the present invention achieved an improvement in ripening rate of silver halide in the fine grain supplying method.

Further, it was shown that the invention led to a smaller volume of the final emulsion. In view thereof, the present invention is a useful method providing an emulsion improved in chemical ripening and efficiency in the subsequent process such as storage, transportation, coating and drying.

What is claimed is:

1. A method for desalting a silver halide emulsion comprising removing soluble salts from the silver halide emulsion by electrodialysis, wherein said electrodialysis is carried out at a pH within a range of ±0.5 of an isoelectric point of a gelatin contained in the silver halide emulsion and a salt is added to said emulsion during said electrodialysis.

2. The method of claim 1, wherein the electrodialysis is carried out at a pH within a range of ±0.2 of the isoelectric point of the gelatin.

3. The method of claim 2, wherein the electrodialysis is carried out at a pH of the isoelectric point of the gelatin.

4. The method of claim 1, wherein said salt is potassium nitrate.

5. A silver halide emulsion desalted by the method as claimed in claim 1.

6. The method of claim 1 wherein said emulsion has an original conductivity prior to said electrodialysis, said salt being added when said original conductivity has been reduced to a lowered conductivity which is a maximum of 30% of said original conductivity.

7. The method of claim 6 wherein said salt is added in an amount such that said original conductivity is not exceeded.

8. A method of preparing a desalted silver halide emulsion by a process comprising (i) mixing an aqueous silver salt solution, an aqueous halide solution and an aqueous gelatin solution to produce a silver halide emulsion comprising silver halide grains having an average size of not more than 0.05 μm, (ii) subjecting the silver halide emulsion to desalting which comprises removing soluble salts by applying electrodialysis to the silver halide emulsion, wherein said electrodialysis is carried out at a pH which is ±0.5 of an isoelectric point of a gelatin contained in said silver halide emulsion and a salt is added during said electrodialysis, and (iii) supplying said desalted silver halide emulsion, as a source of silver halide, to another emulsion comprising silver halide seed grains to cause said seed grains to grow.

9. The method of claim 8 wherein said emulsion has an original conductivity prior to said electrodialysis, said salt being added when said original conductivity has been reduced to a lowered conductivity which is a maximum of 30% of said original conductivity.

10. The method of claim 9 wherein said salt is added in an amount such that said original conductivity is not exceeded.

* * * * *